United States Patent [19]

Becker et al.

[11] 3,857,821

[45] Dec. 31, 1974

[54] ACETYLENE GROUP-CONTAINING POLYMERS

[76] Inventors: Ernst Becker, 18 Fichtestrasse, 6700 Ludwigshafen; Herbert Naarmann, 15 Haardtblick, 6719 Wattenheim; Kurt Schneider, Auf dem Koeppel, 6702 Bad Duerkheim 1; Hellmuth Kessler, 17 An der Tuchbleiche, 6712 Bobenheim-Roxheim 2, all of Germany

[22] Filed: Sept. 19, 1973

[21] Appl. No.: 398,572

[52] U.S. Cl........ 260/78.4 E, 117/161, 260/78.4 A, 260/78.5 B, 260/78.5 BB, 260/78.5 UA, 260/83.5, 260/85.5 ES, 260/86.1 R, 260/86.1 E, 260/86.1 N, 260/86.3, 260/86.7, 260/89.5 R

[51] Int. Cl.......... C08f 3/64, C08f 3/66, C08f 9/00

[58] Field of Search... 260/78.4 E, 78.5 BB, 86.1 R, 260/89.5 R

[56] References Cited
UNITED STATES PATENTS

| | | | |
|---|---|---|---|
| 3,183,216 | 5/1965 | Cohen et al.................. | 260/89.5 R |
| 3,562,236 | 2/1971 | D'Alelio....................... | 260/89.5 R |
| 3,639,348 | 2/1972 | D'Alelio....................... | 260/89.5 R |

*Primary Examiner*—Harry Wong, Jr.
*Attorney, Agent, or Firm*—Johnston, Keil, Thompson & Shurtleff

[57] ABSTRACT

Acetylene group-containing polymers manufactured by homopolymerization or copolymerization of acrylates of specific acetylene group-bearing alcohols. The polymers may be used in the manufacture of shaped articles, coatings or adhesives.

2 Claims, No Drawings

ACETYLENE GROUP-CONTAINING POLYMERS

This invention relates to novel polymers containing units of the general formula:

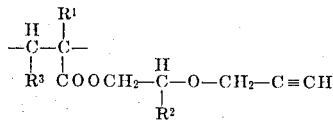

in which $R^1$ and $R^2$ denote hydrogen or methyl and $R^3$ denotes hydrogen or carboxyl or a carboxyl derivative such as a salt, ester or amide thereof.

It is well known that vinyl compounds not containing acetylene groups may be readily polymerized. Vinyl compounds which contain acetylene groups, for example methyl butenynol, are virtually nonpolymerizable to high molecular weight substances under the usual conditions. For this reason, such compounds are used as chain stoppers in free radical polymerizations.

We have now found that acetylene group-containing polymers may be obtained if acetylene derivatives of the general formula

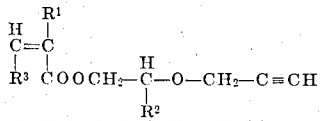

in which $R^1$ and $R^2$ denote hydrogen or methyl and $R^3$ denotes hydrogen or carboxyl or a carboxyl derivative, are polymerized by free-radical polymerization, optionally together with other olefinically unsaturated monomers.

This process thus makes it possible to obtain high molecular weight materials containing acetylene groups. Such polymers are accessible to further reactions at the acetylene group. The novel polymers may have molecular weights of between 1,000 and 1,000,000 and preferably between 10,000 and 100,000.

Suitable unsaturated acetylene derivates are:

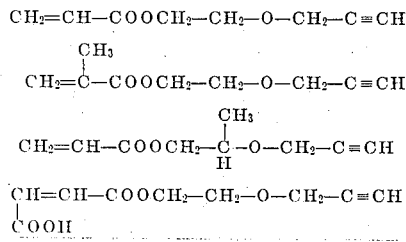

Such acetylene derivatives may be made, for example, by reacting, in a first stage, propargyl alcohol with ethylene oxide or propylene oxide to form the corresponding acetylene alcohol, which is then, in a second stage, esterified with acrylic acid, methacrylic acid, maleic acid or maleic anhydride, or acrylates or methacrylates are transesterified with the said acetylene alcohols.

Suitable olefinically unsaturated monomers which may be copolymerized with the acetylene derivatives are for example olefins such as ethylene, propylene, butadiene and isoprene; styrene and substituted styrenes such as α-methylstyrene, p-chlorostyrene and p-methylstyrene; acrylates and methacrylates of, for example, methanol, ethanol, butanol and ethylcyclohexanol; hydroxy and amino derivatives of acrylates such as hydroxypropyl acrylate and dimethylamino-ethyl acrylate; acrylamide and methacrylamide and substituted amides such as N-methylol acrylamide, N-methylol methacrylamide and their ethers; acrylonitrile and methacrylonitrile; vinyl esters such as vinyl acetate and vinyl propionate; vinyl ethers such as methyl vinyl ether and ethyl vinyl ether; and fumaric, maleic and itaconic acids and esters and anhydrides thereof. Two or more of these monomeric compounds may be copolymerized with the acetylene derivatives simultaneously if desired.

When producing the copolymers, the proportion of unsaturated acetylene derivatives may vary within wide limits, for example between 1 and 99% and in particular between 5 and 20%, by weight. For copolymerization with maleic and fumaric acid derivatives, it is preferred to polymerize the comonomers at a molar ratio of 1:1.

Polymerization is initiated either thermally or with conventional free-radical initiators. Suitable initiators are for example hydrogen peroxide, inorganic peroxides or organic hydroperoxides and peroxides, aliphatic azo compounds which decompose into free radicals, redox catalyst systems, such as the systems persulfate and ascorbic acid, sodium hydrosulfite and iron (II) salts, and also conventional free-radical chelates of transition metals, particularly those in which the metal is present in an unusual valency, for example chelates of manganese (III), cobalt (III), copper (II) and cerium (IV) with 1,3-dicarbonyl compounds.

The initiators are generally used in an amount of from 0.05 to 5% by weight of the weight of monomer. The optimum amount and the initiator giving optimum results may be readily determined by simple experiment.

Polymerization may be carried out in bulk, but it is also possible to operate in the presence of solvents or diluents. Particularly suitable solvents or diluents are for example alcohols, ketones, ethers, and aliphatic, cycloaliphatic and aromatic hydrocarbons such as formamide and dimethyl formamide. A particularly advantageous diluent is water.

Suspension, solution and emulsion polymerization processes as normally carried out on other monomers are also suitable for our novel process. Also as regards any auxiliaries used, such as buffer substances, dispersing agents, protective colloids and the like, our new process does not differ from prior art processes.

Polymerization may be effected within wide temperature limits, for example at temperatures between 0° and 150°C and preferably between 50° and 120°C. In general, polymerization is carried out at atmospheric pressure, but lower or higher pressures, for example pressures of up to 3,000 atmospheres, may be used if desired. In particular, if low-boiling comonomers are used, polymerization is carried out at elevated pressures in order to produce an adequate concentration of comonomer in the reaction mixture.

Copolymerization of the unsaturated acetylene derivative with ethylene or butadiene is advantageously carried out in emulsion by adding the comonomers to an aqueous soap emulsion containing an initiator, a buffer system and, possibly, a protective colloid and then effecting polymerization at elevated pressure. Copolymerization with acrylates is conveniently carried out in aromatic or aliphatic hydrocarbons under the conditions known to be suitable for the polymerization of acrylates.

The polymers of the invention may be used, for example, for producing shaped articles, coatings or adhesives, alone or in admixture with other plastics materials such as polyethylene, polypropylene or copolymers of ethylene and vinyl acetate. Such products have affinity for colorants since the triple bond is accessible to coupling reactions. The surface-active and antistatic properties of the polymers produced in the process make them suitable, inter alia, for finishing papers and textiles. Copolymers with acrylates, which contain from about 2 to 20% of acetylene monomers and from about 2 to 10% of hydroxyl-containing monomers such as hydroxylpropyl acrylate, by weight, are useful as corrosion inhibitors. If, in addition to the acetylene groups, amino groups are incorporated by polymerization, for example via dimethylaminoethyl acrylate, the polymer may be intramolecularly crosslinked by the Niewlands reaction under the action of atmospheric air and copper salts and is useful as a reactive paint.

In the following Examples the parts and percentages are by weight. The K values are a measure of the mean molecular weight. They were determined in 1% solution in dimethyl formamide according to the method of H. Fikentscher in "Cellulosechemie," 13, 58 (1932).

EXAMPLE 1

100 parts of $CH_2=CH-COOCH_2-CH_2-O-CH_2-C\equiv CH$ are stirred together with 0.1 part of azodiisobutyronitrile for 4 hours at 60°C under a blanket of nitrogen. After precipitation with methanol, washing and drying, there are obtained 90.5 parts of a polymer having a K value of 72.5, a glass temperature $T_G$ of −58°C and a refractive index $n_D^{20}$ of 1.6845.

EXAMPLES 2 to 12

Ethyl acrylate and

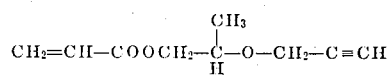

are mixed in specific proportions and each mixture is mixed with 0.1% of azodiisobutyronitrile and heated for 2 hours at 70°C. The copolymers are precipitated with methanol, washed and dried in a vacuum drying cabinet for 10 hours at 60°C at 12 mm of Hg. The properties of the resulting products are listed in the following Table.

TABLE

| Example | Acetylene compound (%) | Conversion (%) | K value | Proportion of acetylene compound in copolymer (%) |
|---|---|---|---|---|
| 2 | 1 | 96 | 66.8 | 0.4 |
| 3 | 5 | 94.6 | 64.7 | 4.2 |
| 4 | 10 | 96.2 | 63.4 | 10.3 |
| 5 | 20 | 96.6 | 60.9 | 11.1 |
| 6 | 30 | 96.3 | 61.5 | 14.5 |
| 7 | 40 | 99.8 | 69.7 | 23.5 |
| 8 | 50 | 93.5 | 68.4 | 32.1 |
| 9 | 60 | 97.8 | 66.9 | 48.0 |
| 10 | 70 | 100 | 67.8 | 55.0 |
| 11 | 80 | 100 | 65.5 | 73.0 |
| 12 | 90 | 100 | 62.0 | 89.7 |

EXAMPLE 13

30 parts of

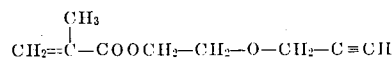

are mixed with 2 parts of sodium pyrophosphate, 4.5 parts of potassium persulfate, 2 parts of the sodium salt of a sulfonated fatty alcohol of from 10 to 15 carbon atoms and 1,000 parts of water. This mixture is stirred for 8 hours at 90°C under an ethylene pressure of 285 atm. gage. On completion of this reaction time, the dispersion has a solids content of 20%. The K value of the polymer is 44. The proportion of polymerized units of acetylene derivative is 10.3%.

EXAMPLE 14

Example 13 is repeated except that the acetylene derivative used is

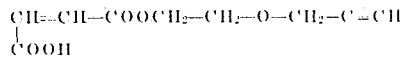

and that the ethylene is replaced by butadiene. The mixture is stirred for 8 hours at 90°C under a butadiene pressure of 6 atm. gage, to give a dispersion having a solids content of 26%. The K value of the copolymer is 62.5, the proportion of polymerized units of acetylene derivative therein being 17.5%.

EXAMPLE 15

Example 9 is repeated except that the acrylic acid is replaced by acrylonitrile. A conversion of 89% is obtained, the polymer having a K value of 70.5 and containing 53% of polymerized units of acetylene derivative.

EXAMPLE 16

70 parts of a mixture of ethyl acrylate, hydroxypropyl acrylate and methyl methacrylate in a ratio of 1:1:1 are polymerized with 30 parts of the acetylene compound used in Example 6.

The resulting copolymer is suitable for use as an enamel for steel sheeting. In the salt spray test (German Standard Specification DIN 50,021, treatment at 35°C with a 5% NaCl solution) it gives no corrosion, unlike an enamel based on a similar copolymer not containing said acetylene compound.

We claim:
1. A process for the manufacture of acetylene group-containing polymers, wherein acetylene derivatives of the formula:

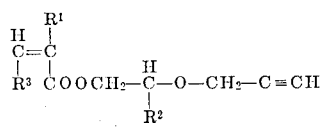

in which $R^1$ and $R^2$ are hydrogen or methyl and $R^3$ is hydrogen or carboxyl, are polymerized together with from 0 to 99% by weight of other olefinically unsaturated monomers by free-radical polymerization.

2. Polymers containing units of the formula:

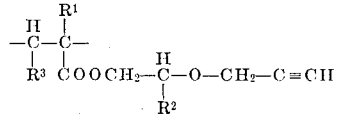

wherein $R^1$ and $R^2$ are hydrogen or methyl and $R^3$ is hydrogen or carboxyl.

* * * * *

UNITED STATES PATENT AND TRADEMARK OFFICE
CERTIFICATE OF CORRECTION

PATENT NO. : 3,857,821
DATED : December 31, 1974
INVENTOR(S) : Ernst Becker, H. Naarmann, K. Schneider, and
H. Kessler It is certified that error appears in the above-identified patent and that said Letters Patent are hereby corrected as shown below:

In the heading, insert --[30] Foreign Application Priority Data, September 27, 1972, Germany, P 22 47 421.1--;

In the heading, insert --[73] Assignee: BASF Fabrik Aktiengesellschaft; Ludwigshafen/Rhine--;

Column 3, line 40, delete "$CH_2=CH-COOCH_2-CH_2-O-CH_2-C\ CH$" and insert --$CH_2=CH-COOCH_2-CH_2-O-CH_2-C\equiv CH$--;

Column 3, line 61, delete "Table. ,150" and insert --Table:--.

Signed and Sealed this fourth Day of November 1975

[SEAL]

Attest:

RUTH C. MASON
Attesting Officer

C. MARSHALL DANN
Commissioner of Patents and Trademarks